United States Patent [19]

Kruschwitz

[11] Patent Number: 4,562,676
[45] Date of Patent: Jan. 7, 1986

[54] WINDOW GLASS MOUNTING ARRANGEMENTS

[75] Inventor: Werner Kruschwitz, Viersen, Fed. Rep. of Germany

[73] Assignee: Draftex Industries, Ltd., Edinburgh, Scotland

[21] Appl. No.: 610,500

[22] Filed: May 15, 1984

[30] Foreign Application Priority Data

May 20, 1983 [GB] United Kingdom ................ 8314080

[51] Int. Cl.⁴ ............................ E06B 3/62; E06B 7/16
[52] U.S. Cl. .......................................... 52/208; 52/98; 52/400; 52/716; 428/31
[58] Field of Search ................................. 52/98–100, 52/204, 208, 400–403, 397, 398, 716–718; 428/31, 122, 188, 358; 248/544; 49/441, 490–496

[56] References Cited

U.S. PATENT DOCUMENTS

| | | | |
|---|---|---|---|
| 2,787,435 | 4/1957 | Shields | 248/544 X |
| 2,812,558 | 11/1957 | Lobanoff . | |
| 3,037,810 | 6/1962 | Kelley | 52/208 |
| 3,462,903 | 8/1969 | Kronbetter | 52/208 X |
| 3,474,586 | 10/1969 | Hoverman . | |
| 3,672,109 | 6/1972 | Erck . | |
| 4,343,121 | 8/1982 | Kruschwitz et al. | 52/208 |
| 4,347,693 | 9/1982 | Kruschwitz | 52/208 |
| 4,405,175 | 9/1983 | Hoffmann | 52/208 X |
| 4,438,609 | 3/1984 | Nielson et al. | 52/208 |

FOREIGN PATENT DOCUMENTS

| | | |
|---|---|---|
| 0073350 | 3/1983 | European Pat. Off. . |
| 0079839 | 5/1983 | European Pat. Off. . |
| 1389317 | 11/1965 | France . |
| 1490200 | 7/1967 | France . |
| 2449560 | 9/1980 | France . |
| 754311 | 8/1956 | United Kingdom . |
| 1239935 | 7/1971 | United Kingdom . |
| 2046338 | 11/1980 | United Kingdom . |

Primary Examiner—Donald G. Kelly
Assistant Examiner—Richard E. Chilcot, Jr.
Attorney, Agent, or Firm—Leydig, Voit & Mayer, Ltd.

[57] ABSTRACT

A mounting arrangement for mounting a windscreen or windshield glass is made of plastics or rubber material with an embedded metal carrier for mounting the arrangement on a flanged joint running around the window opening. The flexible material defines a ledge-shaped surface having a recess for receiving mastic. The mounting arrangement is delivered to the vehicle manufacturer with the mastic in position and covered by a thin flap. To facilitate entry of the window glass onto the ledge-shaped surface, a lip adjacent the ledge may be bent downwards into a slot. At the same time, the flap is pulled outwardly from under the distal edge of the window glass. Thereafter, the flap lies along the external peripheral edge of the window glass and the latter is secured in position by the mastic. A stiffening member is then placed in the slot. The arrangement provides substantially flush-mounting of the window glass, and no part of the flexible material or of the stiffening member extends further outwards of the window opening than the flap to any significant extent.

11 Claims, 2 Drawing Figures

WINDOW GLASS MOUNTING ARRANGEMENTS

BACKGROUND OF THE INVENTION

The invention relates to window glass mounting arrangements such as, for example, for use in motor vehicles.

BRIEF SUMMARY OF THE INVENTION

According to the invention, there is provided a window glass mounting arrangement, comprising support means for supporting the arrangement on a frame of the window opening, the support means defining a surface of flexible material running at least partly around the window opening for sealingly receiving the window glass and defining means for receiving a mastic substance for securing the window glass in position, and a flap of flexible material which, when the window glass is not in position, covers the mastic and, when the window glass is in position, lies along an external edge surface of the window glass so as to obscure the mastic from external visibility.

According to the invention, there is also provided a window glass mounting arrangement comprising mounting means for supporting attachment on a surround running around the window opening, the mounting means defining flexible material defining a ledge-shaped surface running at least partly around the window opening for receiving the peripheral edge of the window glass, the said ledge-shaped surface defining a recess for receiving a mastic for adhesively securing the window glass in position on the ledge surface and a longitudinally extending flap of flexible material which, when the window glass is not in position, extends over the recess so as to cover the mastic therein and, when the window glass is in position, lies along the external peripheral surface of the window glass so as to visually obscure the mastic, no part of the mounting arrangement projecting outwardly of the external surface of the window glass to any significant extend beyond the flap.

DESCRIPTION OF THE DRAWINGS

A window glass mounting arrangement embodying the invention will now be described, by way of example only, with reference to the accompanying drawing in which.

DESCRIPTION OF PREFERRED EMBODIMENTS

Figure 1:
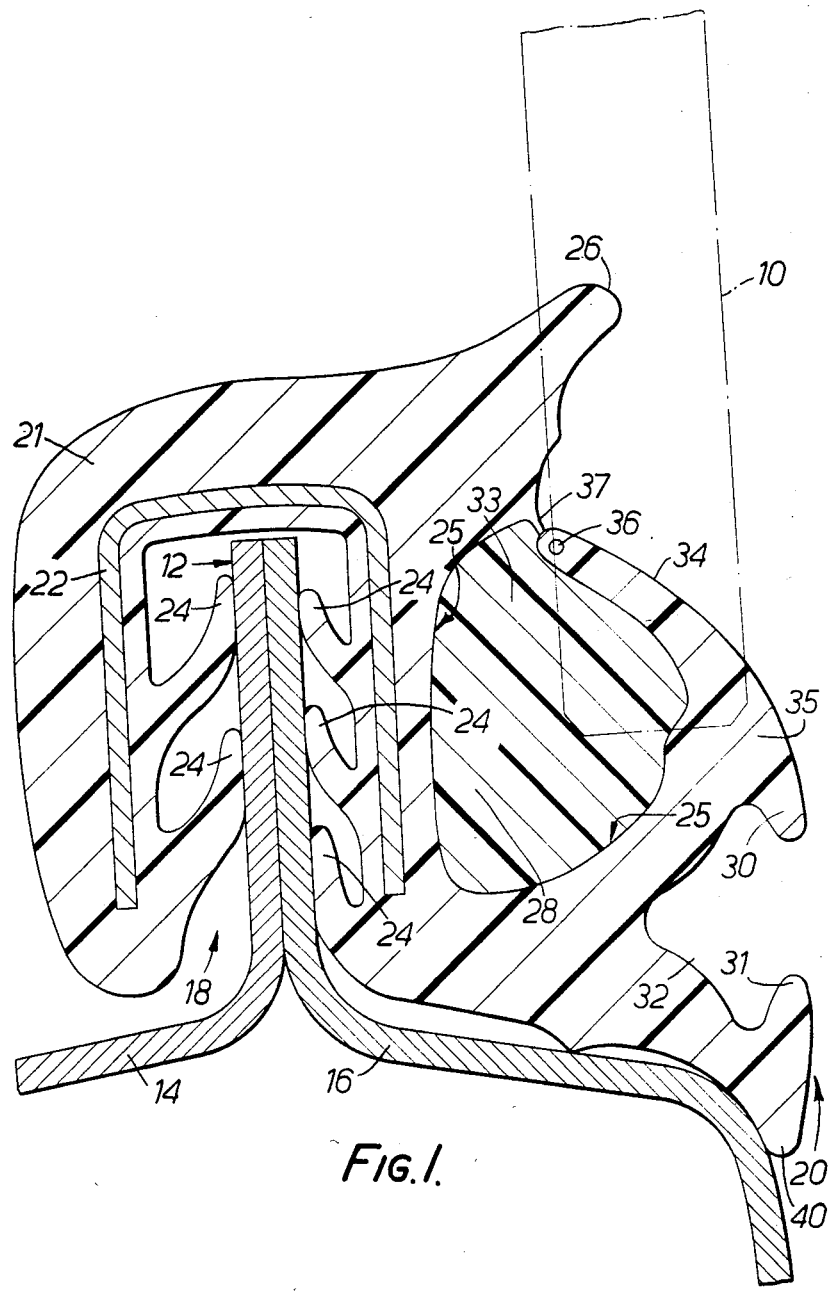
FIG. 1 is a cross-section through the mounting arrangement before the window glass is in position.

The mounting arrangement now to be described in more detail is for mounting a window glass 10, such as the windscreen or windshield glass of a motor vehicle (though not restricted thereto), in a window opening in the vehicle, the window opening being surrounded by a bodywork flanged joint 12 lying parallel to the plane of the window opening. The flanged joint 12 is formed between two bodywork portions 14 and 16.

The mounting arrangement comprises a gripping portion 18 and a mounting and sealing portion 20 which are made of integral plastics or rubber material 21.

The gripping portion 18 is channel-shaped in cross-section and has embedded in it a reinforcing carrier 22 of any suitable form. For example, the carrier may be made of metal and in the form of side-by-side U-shaped elements either connected together or entirely disconnected. Instead, it could be made of wire looped to and fro across the channel. Preferably, it is embedded in the material 21 by a cross-head extrusion process.

The material 21 is extruded so as to provide integral gripping lips 24.

The mounting and sealing portion is extruded so as to provide a generally ledge-shaped surface 25 having a lip 26 and a recess 28. In addition, it provides lips 30 and 31 defining a generally V-shaped slot 32.

Mastic 33 of any suitable form is positioned in the recess 28. A web-like flap 34 of thin flexible material is anchored to the surface 25 along an external edge thereof, at 35. Along its opposite edge, the flap 34 has beading 36 of any suitable form and is secured to the adjacent wall of the ledge-shaped surface 25 by a very thin membrane 37. Advantageously, the flap 34 is formed of the same material as the material 21 and is extruded integrally therewith, though this is not essential.

The mounting arrangement shown is manufactured in strips of indeterminate length which are then cut to the peripheral length of the window opening. The mastic 33 is placed in position by the manufacturer of the mounting arrangement so as to be covered by the flap 34. The mounting arrangement with the mastic in it is delivered in this form to the motor manufacturer. In this way, the motor manufacturer does not have to place the mastic in position himself and, furthermore, the flap 34 securely covers, retains and protects the mastic.

The motor manufacturer fixes the mounting arrangment in position by placing the gripping portion 18 over the flanged joint 12 and pressing it thereon so that it firmly grips itself in position, helped by the gripping and sealing lips 24.

The window glass 10 is then placed into position on the ledge-shaped surface 25. To facilitate this process, the lip 30 is, during the assembly of the window glass, bent downwardly and inwardly of the slot 32 so as to provide additional clearance for the entry of the window glass, and is thereafter allowed to resile into its generally horizontal position. During this process, the window glass presses the flap 34 downwardly and ruptures the membrane 37. By means of a suitable tool, the flap 34 is then pulled outwardly under the lower edge of the window glass, the beading 36 stiffening the now-free edge of the flap and assisting this process. During this process, the flap hinges along the line 35.

The flap 34 is now clear of the mastic 33 which thus adheres to the window glass and holds it firmly in position on the ledge-shaped surface.

Figure 2:
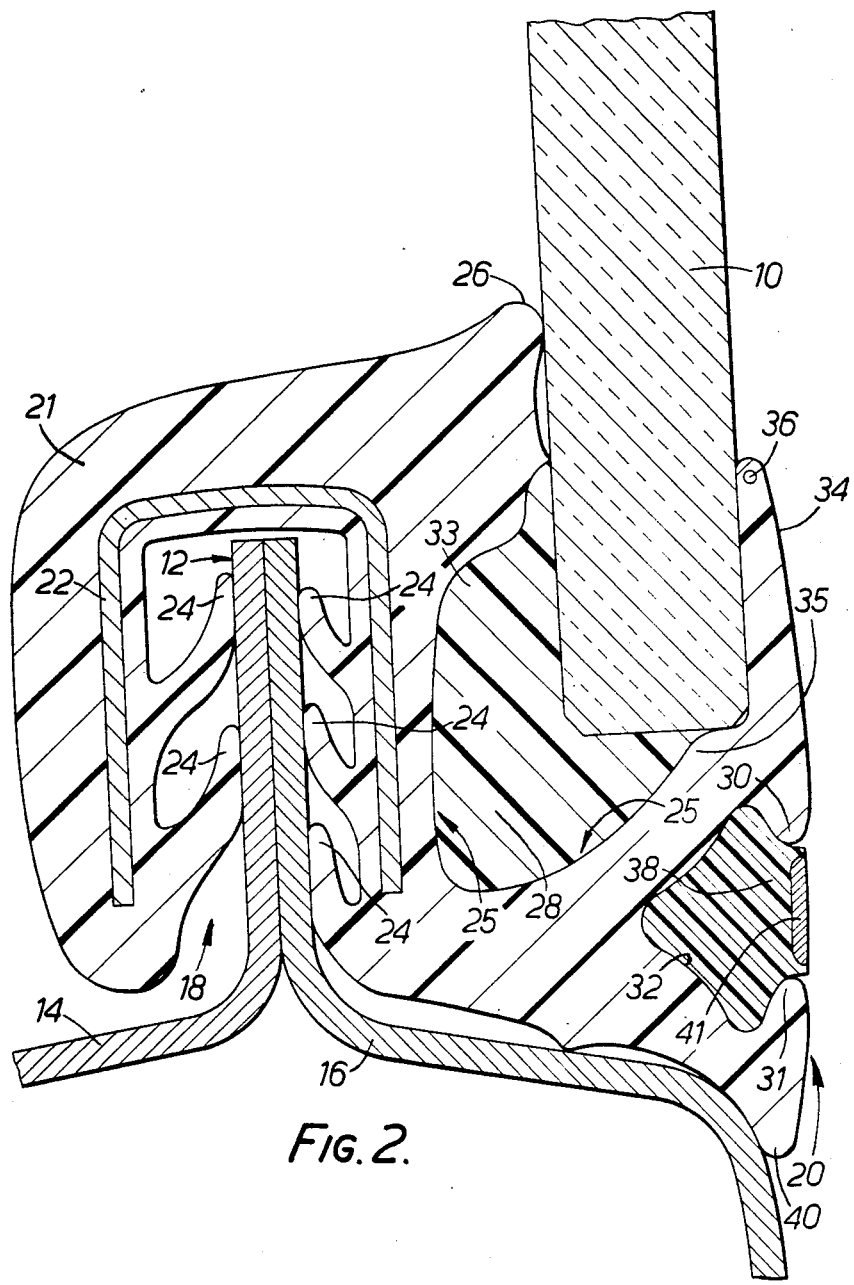
FIG. 2 corresponds to FIG. 1 but shows the glass in position.

As shown in FIG. 2, the outwardly hinged flap 34 now lies against the external peripheral surface of the window glass 10, and not only helps to retain the window glass in position but prevents the mastic from being externally visible through the glass.

Finally, a stiffening member 38, made of relatively hard plastics or rubber material for example, is forced into the slot 32, around the whole length of the mounting arrangement, so as to become locked into position by the re-entrant lips 30 and 31. The stiffening member 38 thus holds the lip 30 firmly in the attitude shown, thus helping to hold the window glass 10 firmly in position. The stiffening member 38 advantageously carries a bright trim strip 41.

The lip 40 enables the arrangement to adjust itself in a variety of differently shaped body portions 16.

The mounting arrangement is advantageous because it provides an outer surface which is substantially flush with the outer surface of the window glass 10. As will be apparent from FIG. 2, no part of the mounting arrangement projects outwardly of the external surface of the window glass to any significant extent beyond the flap 34.

If desired, the mounting arrangement may be preformed into a closed loop sized to fit a particular size of window opening.

The arrangement shown is advantageous because the window glass 10 is very firmly secured in position on the mounting arrangement by means of the mastic 33, but the mastic does not directly secure the window glass to the vehicle body. The latter is achieved by the gripping portion 18, and this enables greater tolerances in the dimension of the vehicle body to be permitted and provides a reduced fixing time.

The arrangement is also advantageous because the vehicle manufacturer himself does not have to concern himself with the mastic. The mounting arrangement is delivered to him with the mastic in position and yet in such a fashion that there is no risk (because of the flap 34) of the mastic leaking.

The arrangement is not of course limited to the securing of windshield or windscreen glass. It may be used for securing a vehicle back light in position or a quarter light window, or any other useful application.

What is claimed is:

1. A window glass mounting arrangement, comprising
   support means for supporting the arrangement on a frame of the window opening,
   the support means defining a ledge shaped surface of flexible material running at least partly around the window opening for sealingly receiving the window glass,
   a flap of flexible material integral with the flexible material of the said ledge-shaped surface,
   the flap extending integrally from one longitudinal margin of the said surface and being integrally attached to the opposite longitudinal margin thereof by a rupturable strip so that the flap and the said surface define a hollow longitudinally extending enclosure, and
   mastic substantially filling the said hollow enclosure,
   the rupturable strip being ruptured to permit the flap to be bent away from the said surface thereby permitting entry of the window glass onto the said surface and into contact with the mastic,
   whereby, before the window glass is in position, the flap lies along an external edge surface of the window glass so as to obscure the mastic from external visibility.

2. An arrangement according to claim 1, in which the support means comprises means defining a channel in flexible material which is integral with the flexible material defining the said surface but spaced from that surface, the said channel being adapted to embrace and grip a mounting flange or the like running around the window opening.

3. An arrangement according to claim 1, in which the flexible material is reinforced with an embedded carrier of channel-shape and embracing the said channel.

4. An arrangement according to claim 1, in which the facing internal walls of the flexible material, where it defines the said channel, define one or more lips running along the length of the channel and projecting inwardly of the channel so as to grip and seal against the sides of the mounting flange.

5. An arrangement according to claim 1, in which the said flexible material is formed with a slot having longitudinal side walls running along the length of the mounting arrangement adjacent to the said surface, the material defining the said surface also forming at least part of one of the longitudinal side walls of the said slot, whereby the material can be flexed inwardly of the said slot so as to provide additional clearance for entry of the window glass, whereafter the flexible material may be allowed to resile, the arrangement including a relatively stiff longitudinally extending stiffening member sized to fit into the said slot after the flexed material has resiled to hold the said surface in supporting relationship with an edge of the window glass.

6. An arrangement according to claim 1, in which, when the window glass is in position, no part of the arrangement projects outwardly of the external surface of the window glass to any significant extent beyond the said flap where it lies against that external surface.

7. A window glass mounting arrangement comprising
   mounting means for supporting attachment on a surround running around the window opening, the mounting means beind made of flexible material defining a ledge-shaped surface running at least partly around the window opening for receiving both the peripheral edge of the window glass and an adjacent peripheral strip of one of the two surfaces of the window glass adjacent that edge, the said ledge-shaped surface defining a recess for receiving a mastic for adhesively securing the window glass in position on the lege-shaped surface, and
   a longitudinally extending flap of flexible material integrally extending from the distal edge of that part of the ledge-shaped surface which receives the peripheral edge of the window glass so as to meet that part of the ledge-shaped surface receiving the said peripheral strip of the said one surface of the window glass and being integrally attached to the latter part of the ledge-shaped surface by means of a rupturable strip,
   whereby, before the window glass is in position, the flap extends over the recess so as completely to enclose the mastic and, when the window glass is in position, the flap lies along the peripheral strip of the other of the said two surfaces of the window glass adjacent the said edge so as to visually obscure the mastic, no part of the mounting arrangement projecting outwardly of the said other surface of the window glass to any significant extent beyond the flap.

8. An arrangement according to claim 7, in which the mounting means comprises flexible material integral with the flexible material defining the ledge-shaped surface and defining a longitudinal channel spaced from the ledge-shaped surface and sized so as to embracingly grip a mounting flange running around the window opening.

9. An arrangement according to claim 7, in which a reinforcing metal carrier is embedded in the flexible material where it defines the said channel.

10. An arrangement according to claim 7, in which the flexible material defining the channel is provided with integral gripping lips extending inwardly of the channel so as to make gripping and sealing contact with the sides of the said flange.

11. An arrangement according to claim 7, in which the base of the ledge-shaped surface forms at least part of one wall of a longitudinally extending slot defined in the flexible material, whereby the said base may be flexed inwardly of the said slot to provide additional clearance for entry of the window glass, the said base thereafter resiling and being held in the resiled position by means of a stiffening member which is sized to fit into the said slot.

* * * * *